United States Patent
Rode et al.

(10) Patent No.: US 10,903,611 B2
(45) Date of Patent: Jan. 26, 2021

(54) JOINT PULLER FOR BUSWAY ASSEMBLY

(71) Applicant: EATON INTELLIGENT POWER LIMITED, Dublin (IE)

(72) Inventors: Prashant Pandurang Rode, Jaysingpur (IN); Ben Schermerhorn, Greenwood, SC (US); Gordon Pettersen, Greenwood, SC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/950,502

(22) Filed: Apr. 11, 2018

(65) Prior Publication Data

US 2019/0148897 A1     May 16, 2019

Related U.S. Application Data (60) Provisional application No. 62/584,209, filed on Nov. 10, 2017.

(51) Int. Cl.
| | |
|---|---|
| *H01R 25/16* | (2006.01) |
| *H02G 5/04* | (2006.01) |
| *H02G 3/04* | (2006.01) |
| *H02G 5/00* | (2006.01) |
| *H01R 43/26* | (2006.01) |

(52) U.S. Cl.
CPC ............. *H01R 25/162* (2013.01); *H02G 3/04* (2013.01); *H02G 5/007* (2013.01); *H02G 5/04* (2013.01); *H01R 25/161* (2013.01); *H01R 43/26* (2013.01)

(58) Field of Classification Search
CPC .... H01R 25/162; H01R 25/145; H01R 25/14; H01R 4/60; H02G 5/007
USPC ............... 439/210, 212, 213, 611; 174/88 B
See application file for complete search history.

(56) References Cited

U.S. PATENT DOCUMENTS

| | | | | | |
|---|---|---|---|---|---|
| 5,760,339 | A | * | 6/1998 | Faulkner ............... | H01R 25/162 174/88 B |
| 5,783,779 | A | * | 7/1998 | Graham ................. | H02G 5/007 174/88 B |
| 5,821,464 | A | * | 10/1998 | Graham ................. | H02G 5/007 174/86 |
| 6,435,888 | B1 | * | 8/2002 | Reed, Jr. .................. | H01R 4/30 174/88 B |
| 8,500,475 | B2 | * | 8/2013 | Takehara ............... | H01R 4/305 174/88 B |

(Continued)

FOREIGN PATENT DOCUMENTS

| | | | | | |
|---|---|---|---|---|---|
| EP | | 1811622 A1 | * | 7/2007 | ............... H02B 3/00 |

*Primary Examiner* — Abdullah A Riyami
*Assistant Examiner* — Marcus E Harcum
(74) *Attorney, Agent, or Firm* — Squire Patton Boggs (US) LLP (57) ABSTRACT

A joint puller includes an arm having a first arm end and a second arm end, and a lever having a first lever end and a second lever end. The first arm end is configured to be pivotally connected to a first busway section, and the second lever end is configured to be pivotally connected to a second busway section. The first lever end is pivotally connected to the arm at a location spaced from the first arm end. The joint puller further includes a stopper extending from the lever at a location spaced from the first lever end. The stopper contacts the arm when the arm is pivoted to a predetermined angle with respect to the lever.

18 Claims, 6 Drawing Sheets

(56) References Cited

U.S. PATENT DOCUMENTS

| | | | |
|---|---|---|---|
| 8,717,741 B2* | 5/2014 | Valenzuela | H01R 25/162 |
| | | | 174/149 B |
| 8,900,002 B2* | 12/2014 | Mooney | H01R 4/60 |
| | | | 439/212 |
| 9,882,366 B2* | 1/2018 | Maurer | H02G 5/007 |
| 2010/0012375 A1* | 1/2010 | Jur | H01R 25/162 |
| | | | 174/88 B |
| 2014/0120755 A1* | 5/2014 | Walgenbach | H02G 5/007 |
| | | | 439/213 |
| 2015/0118878 A1* | 4/2015 | Dolinski | H01R 13/193 |
| | | | 439/212 |
| 2016/0156169 A1* | 6/2016 | Jaena | H02G 5/08 |
| | | | 439/213 |
| 2016/0181749 A1* | 6/2016 | Rathjen | H01R 25/142 |
| | | | 439/122 |
| 2019/0020159 A1* | 1/2019 | Wynnik | H02G 5/007 |
| 2019/0052034 A1* | 2/2019 | Orris | H01R 25/142 |

* cited by examiner

JOINT PULLER FOR BUSWAY ASSEMBLY

CROSS-REFERENCE TO RELATED APPLICATION

This application claims priority to U.S. Provisional Patent Application No. 62/584,209, filed on Nov. 10, 2017. The disclosure of the provisional application is incorporated by reference herein in its entirety.

FIELD OF INVENTION

The present disclosure relates to a joint puller for a busway assembly. More specifically, the present disclosure relates to a joint puller for assembling a pair of busway sections to a bridge joint in a busway assembly.

BACKGROUND

Busway installations consist of several pieces of bus duct that are connected with bridge joints. Bridge joints transfer the electrical load from one busway piece to the next via conductor plates and insulator plates. The joint may be assembled via a bolted joint connection, ensuring that the proper contact is maintained between phases of each busway piece.

To assembly busway sections, a pair of busway sections and a bridge joint are provided. Busbars from each busway section are inserted into bridge plates on two sides of a bridge joint. The busway sections and bridge plates are then fixedly attached to each other with fasteners, such as bolts. The insertion of the busway sections may be done by hand or with the use of a joint puller. Known joint pullers cannot be operated on both sides of a busway simultaneously and require tools for installation, such as lifting brackets. Lifting brackets are connected to ends of busway sections and the joint pullers are connected to the lifting bracket rather than directly to the busway section. Moreover, if too much force is applied to a joint puller, the puller may cause to damage busway components or injury to the operator.

SUMMARY

In one embodiment, a busway assembly includes a first busway section having a first end terminating in a first end block, and a second busway section having a second end terminating in a second end block. The first busway section includes a first plurality of busbars that are exposed at the first end, and the second busway section includes a second plurality of busbars that are exposed at the second end. The first end block has a first plurality of apertures, and the second end block has a second plurality of apertures. The busway assembly further includes a bridge joint having a first end and a second end. The bridge joint is disposed between the first busway section and the second busway section, and includes a plurality of bridge plates that are exposed at both the first and second ends of the bridge joint. The bridge plates are configured to receive the first plurality of busbars at the first end of the bridge joint, and to receive the second plurality of busbars at the second end of the bridge joint. The busway assembly further includes a joint puller assembly including a lever having a first lever end and a second lever end, and an arm having a first arm end and a second arm end. The arm is pivotally connected to the first lever end at a location spaced from the first arm end. The joint puller further includes a stopper extending from the lever at a location spaced from the first lever end, the stopper being configured to limit rotation between the lever and the arm. The first arm end is pivotally connected to a first side of the first busway section at the first end block, through one of the first plurality of apertures, and the second lever end is pivotally connected to a first side of the second busway section at the second end block, through one of the second plurality of apertures.

In another embodiment, a method of assembling a busway includes providing a first busway section having a first pair of end blocks and a first plurality of busbars, and providing a second busway section having a second pair of end blocks and a second plurality of busbars. The method also includes providing a bridge joint between the first busway section and the second busway section, wherein the bridge joint includes a plurality of bridge plates. The method further includes providing a joint puller assembly having a lever with a first lever end and a second lever end, and an arm with a first arm end and a second arm end. The arm is pivotally connected to the first lever end at a location spaced from the first arm end. The joint puller assembly also includes a stopper extending from the lever at a location spaced from the first lever end. The stopper is configured to limit rotation between the lever and the arm. The method further includes aligning the first plurality of busbars and the second plurality of busbars with the bridge plates. The method also includes pivotally connecting the first arm end to a first side of the first busway section at one of the first pair of end blocks and pivotally connecting the second lever end to a first side of the second busway section at one of the second pair of end blocks. The method also includes pivoting the arm such that the first plurality of busbars and the second plurality of busbars each engage the bridge plates.

In yet another embodiment, a joint puller includes an arm having a first arm end and a second arm end, and a lever having a first lever end and a second lever end. The first arm end is configured to be pivotally connected to a first busway section, and the second lever end is configured to be pivotally connected to a second busway section. The first lever end is pivotally connected to the arm at a location spaced from the first arm end. The joint puller further includes a stopper extending from the lever at a location spaced from the first lever end. The stopper contacts the arm when the arm is pivoted to a predetermined angle with respect to the lever.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
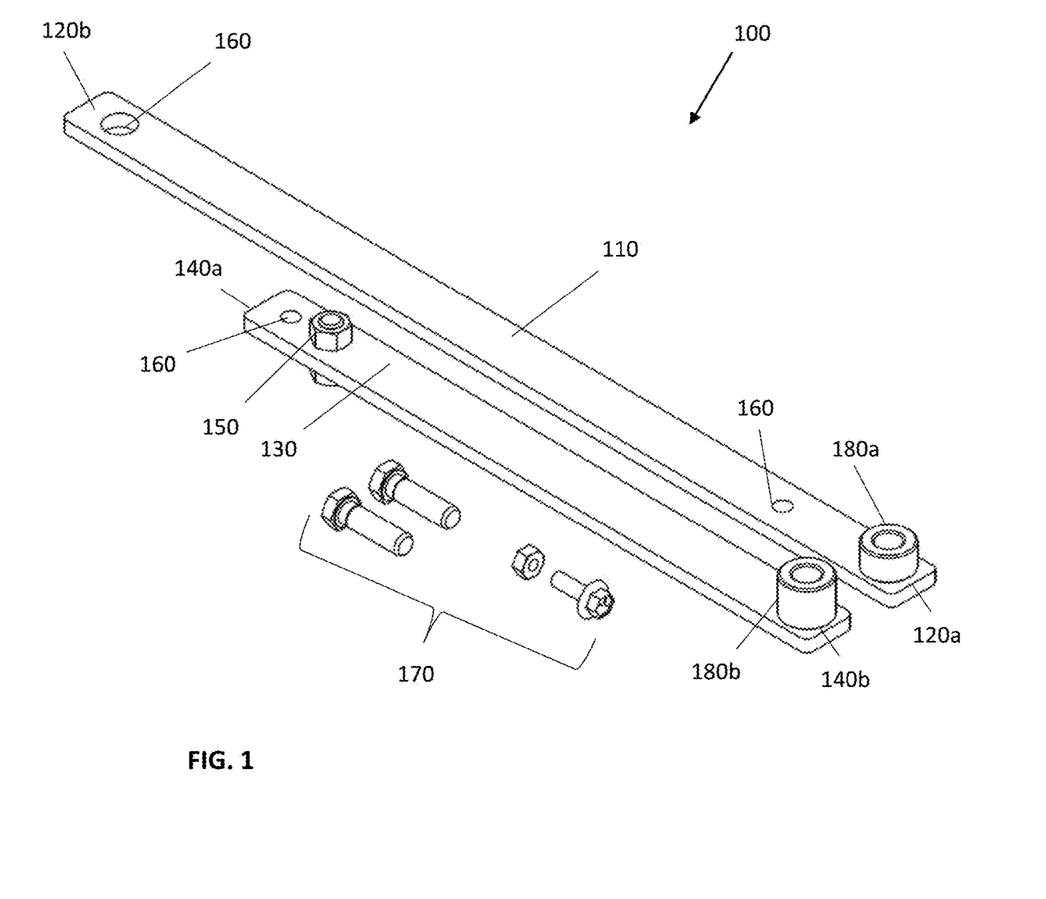
FIG. 1 is a perspective view of one embodiment of a disassembled joint puller.
Figure 2:
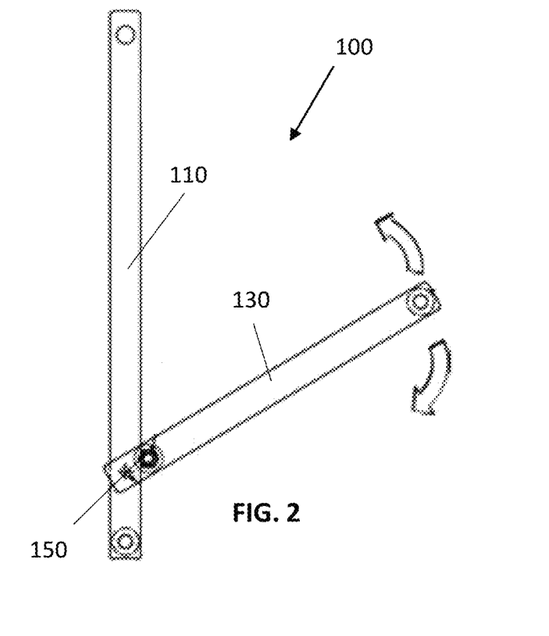
FIG. 2 is a front view of an assembled joint puller.
Figure 3:
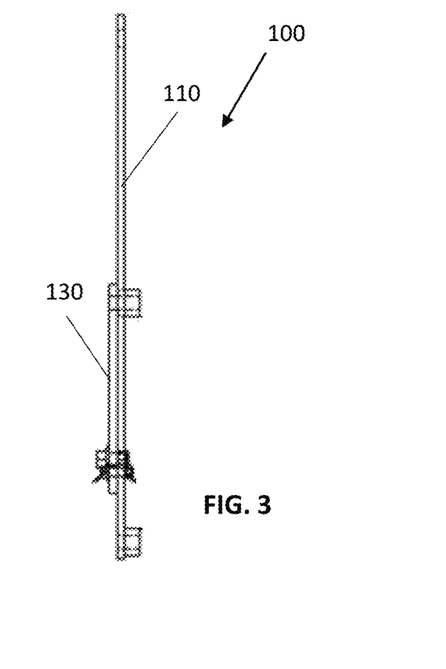
FIG. 3 is a side view of the joint puller.
Figure 4:
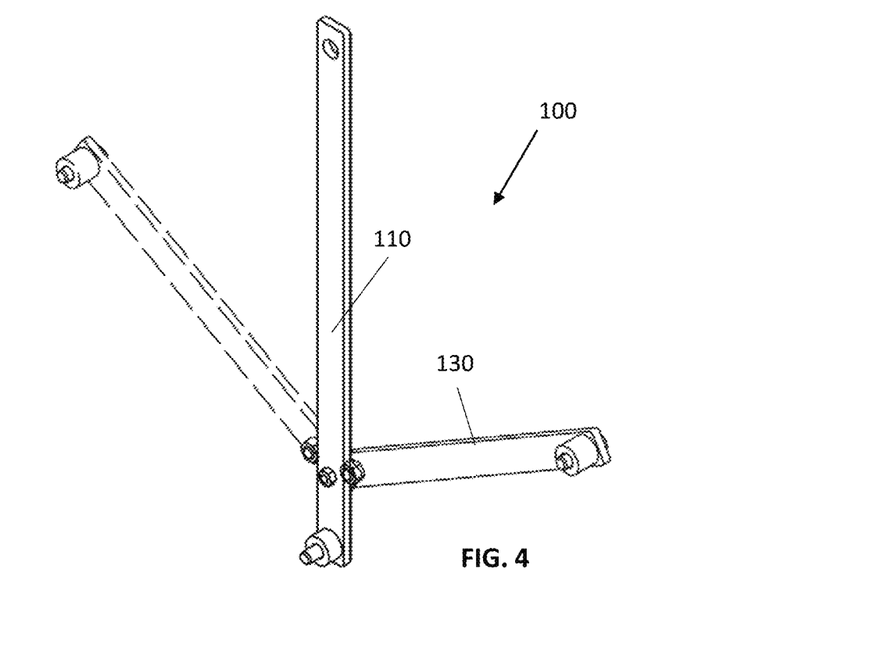
FIG. 4 is a perspective view of the joint puller in a first orientation, with a second orientation shown in phantom.

FIG. 1 illustrates a perspective view of one embodiment of a disassembled joint puller 100, while FIGS. 2-4 show a front, side, and perspective view, respectively, of an assembled joint puller 100. The joint puller 100 includes an arm 110 having a first arm end 120a and a second arm end 120b. The joint puller 100 further includes a lever 130 having a first lever end 140a and a second lever end 140b. In the illustrated embodiment, the arm 110 and lever 130 are rectangular components. In alternative embodiments, that arm and lever may have any elongated shape. The arm may also include additional geometry to facilitate a manual grip by an operator.

The joint puller 100 also includes a stopper 150 extending from the lever 130 at a location spaced from the first lever end 140a. In the illustrated embodiment, the stopper 150 is a bolt secured with a nut through an aperture 160 of the lever. The aperture 160 may be smooth or threaded.

In alternative embodiments, the stopper may be any fixed element attached to the lever. In another alternative embodiment, the stopper may be formed on the lever as a unitary component, such as through a molding or additive manufacturing process. In yet another embodiment, the stopper may be formed on the arm instead of or in addition to the lever.

Each of the arm 110 and lever 130 includes a plurality of apertures 160 configured to receive fasteners 170. The apertures 160 may be smooth or threaded, or a mix of both smooth and threaded apertures may be employed. In the illustrated embodiment, the fasteners are bolts and hexagonal nuts. However, it should be understood that any type of fasteners may be employed. In an alternative embodiment (not shown), the arm or the lever may include a projection such as a pin or threaded rod extending therefrom to be used as a fastener.

In the illustrated embodiment, the joint puller 100 further includes a first spacer 180a connected to the first arm end 120a and a second spacer 180b connected to the second lever end 140b. Here, each spacer is a cylindrical component having a thru-hole that is aligned with an aperture of the arm 110 or lever 130 for receiving a fastener 170.

In one embodiment, the spacers 180a, 180b are welded to the arm 110 and lever 130. In an alternative embodiment, the spacers are fixed to the arm and lever by adhesive, epoxy, a brazing process, or other fixing process. In another alternative embodiment, the spacers are separate components that are placed adjacent to the arm and lever during assembly. In still another alternative embodiment, each spacer may be formed on the arm or lever through a molding or additive manufacturing process. In yet another alternative embodiment, one or more of the spacers may be omitted.

With continued reference to FIGS. 2-4, the joint puller 100 is assembled such that the first lever end 140a is pivotally connected to the arm 110 at a location spaced from the first arm end 120a. The stopper 150 is spaced from the first lever end 140a such that it contacts the arm 110 when the arm 110 is pivoted to a predetermined angle with respect to the lever 130. In an alternative embodiment (not shown), the first arm end is pivotally connected to the lever at a location spaced from the first lever end.

The arm 110 and lever 130 may be connected to each other in different orientations. For example, in the perspective view of FIG. 4, the lever 130 is shown as extending from the right side of the arm 110. However, FIG. 4 further shows an alternative configuration in which a lever (shown in phantom) extends from the left side of the arm 110.

When the joint puller 100 is assembled, the first arm end 120a is configured to be pivotally connected to a first busway section, and the first spacer 180a is dimensioned to provide sufficient clearance from a side of the busway. Likewise, the second lever end 140b is configured to be pivotally connected to a second busway section, and the second spacer 180b is dimensioned to provide sufficient clearance from the side of the busway.

Figure 5:
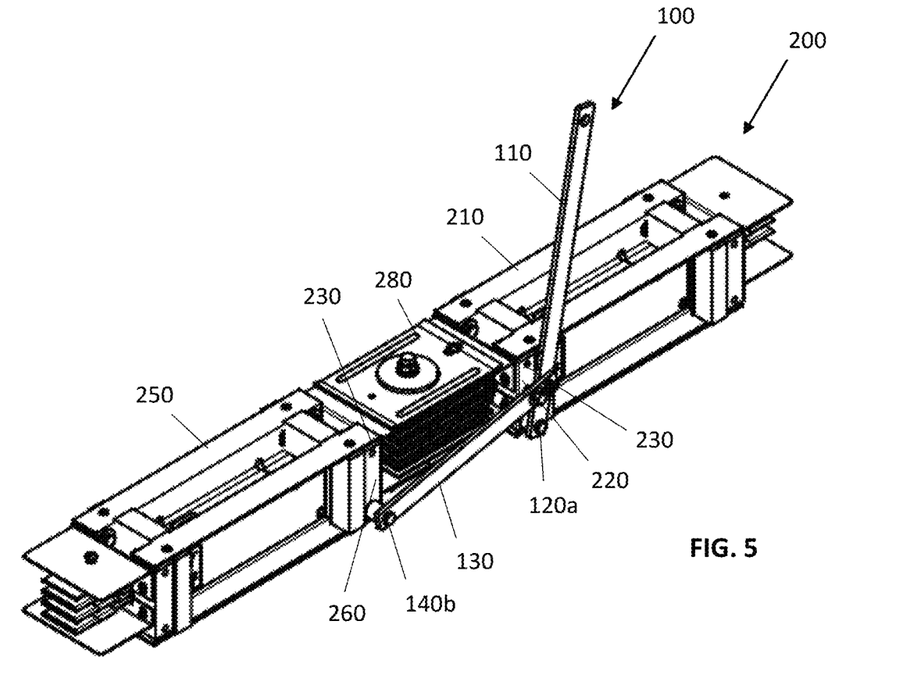
FIG. 5 is a perspective view of the joint puller connected to one embodiment of a busway assembly.
Figure 6:
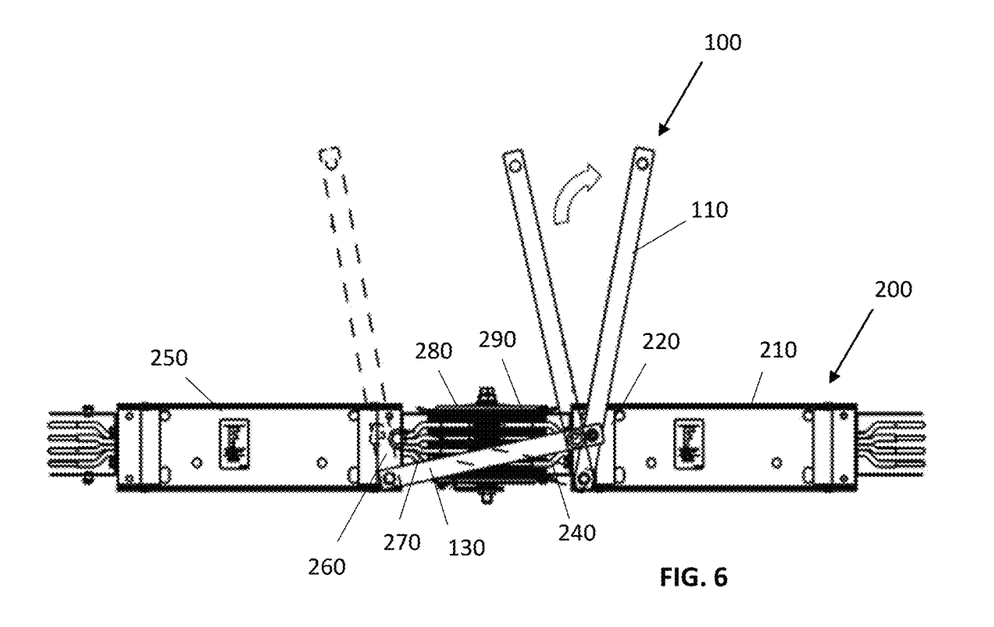
FIG. 6 is a side view of the joint puller connected to the busway assembly in a first position, moving from a first orientation to a second orientation, with the joint puller in a second position also shown in phantom.
Figure 7:
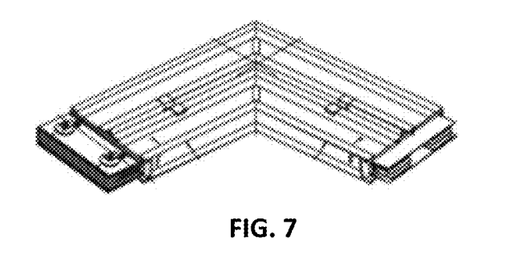
FIG. 7 is a perspective view of an alternative embodiment of a busway component.
Figure 8:
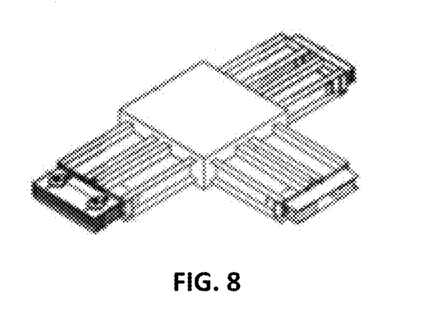
FIG. 8 is a perspective view of another alternative embodiment of a busway component.
Figure 9:
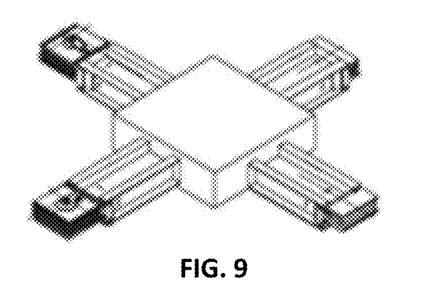
FIG. 9 is a perspective view of yet another alternative embodiment of a busway component.
Figure 10:
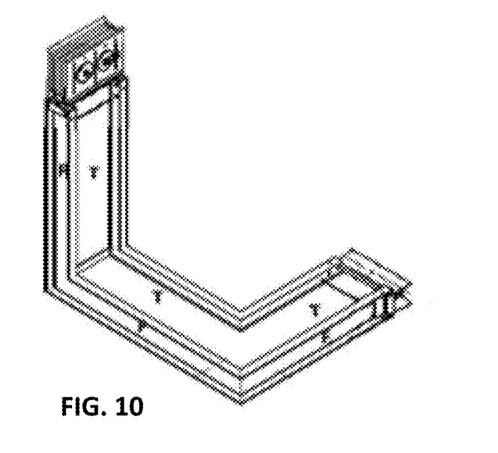
FIG. 10 is a perspective view of still another alternative embodiment of a busway component.

FIGS. 5 and 6 illustrate a perspective and side view, respectively, of the joint puller 100 connected to one embodiment of a busway assembly 200. The busway assembly 200 includes a first busway section 210 having a first end terminating in a first end block 220. The end block 220 has plurality of apertures 230, which may be smooth or threaded. The first busway section 210 includes a first plurality of busbars 240 that are exposed at the first end.

The busway assembly 200 further includes a second busway section 250 having a second end terminating in a second end block 260. The second end block 260 also has a plurality of apertures 230, which may be smooth or threaded. The second busway section 250 includes a second plurality of busbars 270 that are exposed at the second end.

The busway assembly 200 also includes a bridge joint 280 having a first end and a second end. The bridge joint 280 is disposed between the first busway section 210 and the second busway section 250. The bridge joint 280 includes a plurality of bridge plates 290 that are configured to receive the first plurality of busbars 240 at a first end of the bridge joint 280, and to receive the second plurality of busbars 270 at a second end of the bridge joint 280.

In one embodiment, the busway sections 210, 250 and the bridge joint 280 are provided as separate components. In another embodiment, the bridge joint is pre-installed onto an end of a busway section. In still another embodiment, at least one busway section has exposed busbars on one end and bridge plates on another end, without having an otherwise discernable bridge joint.

While the illustrated embodiment shows the first busway section 210, the second busway section 250, and the bridge joint 280 all extending linearly, in alternative embodiments, the bridge joint may connect the busway sections such that they are disposed at an angle with respect to each other. For example, FIGS. 7-10 illustrate busway components that are angled, T-shaped, cross-shaped, and have combination offsets. Such examples are not intended to be limiting, and the joint puller 100 may be employed with busway components of any shape.

While the busway assembly 200 includes two busway sections 210, 250 and a bridge joint 280, it should be understood that any number of busway sections and bridge joints may be linked together to form a busway assembly.

The joint puller 100 is employed to assemble the busway assembly 200. First, the first plurality of busbars 240 of the first busway section 210 and the second plurality of busbars 270 of the second busway section 250 are aligned with the bridge plates 290 of the bridge joint 280. The step of aligning the busway components may occur while the components are hanging flatwise or edgewise (for example, using trapeze style hangers with a pair of drop rods, or using one or more clips with a single drop rod), or while the components are resting on a surface or secured in an assembly. The remaining steps described below may also be performed while the busway components are in any of these states.

In embodiments where a bridge joint is pre-installed onto one of the busway sections, or where a busway section has bridge plates, only a single step is required to align the busbars of one busway section with the bridge plates of another busway section.

After the components are aligned, the joint puller 100 is connected to the first and second busway sections 210, 250. The joint puller 100 may be connected to the busway sections 210, 250 in a number of different orientations. In the embodiment illustrated in FIG. 5, the first arm end 120a is pivotally connected to a left side of the first busway section 210 at the first end block 220. Here, the first spacer 180a is aligned with an aperture 160 of the first arm end 120a and a lower one of the apertures 230 of the first end block 210, such that the arm 110 extends upwards from the first end block 210. A fastener 170 is inserted through the apertures 160, 230 to pivotally connect the arm 110 to the first end block 220.

The second lever end 140b is pivotally connected to a left side of the second busway section 250 at the second end block 260. Here, the second spacer 180b is aligned with an aperture 160 of the second lever end 140b and a lower one of the apertures 230 of the second end block 260. A fastener 170 is inserted through the apertures 160, 230 to pivotally connect the lever 130 to the second end block 260. Thus, in the illustrated embodiment, the joint puller 100 is connected such that the lever 130 is pivotally connected to the second end block 260 and extends towards the first end block 220.

Thus, the joint puller 100 is connected to the first and second busway sections 210, 250 without the use of lifting brackets, or other brackets or connecting components. In an alternative embodiment (not shown), the joint puller may be connected to upper apertures in the end blocks of the busway sections.

After the joint puller 100 is connected to the first and second busway sections 210, 250, the arm 110 is pivoted towards the first busway section 210, as shown in FIG. 6. In one embodiment, the arm 110 is manually pulled by an operator. In another embodiment, a machine is used to pull the arm 110.

The pivoting of the arm 110 pulls the second plurality of busbars 270 into engagement with the bridge plates 290, and further pulls the bridge plates 290 into engagement with the first plurality of busbars 240. The arm 110 is pivoted until the stopper 150 contacts the arm 110, at which point the components of the busway assembly 200 are aligned for fastening. The stopper 150 limits the travel during the joining of the components of the busway assembly 200 to prevent damage to the components.

After the components have been pulled into place, the first arm end 120a may be removed from the first end block 220 and the second arm end 140b may be removed from the second end block 260. The busway sections 210, 250 and the bridge joint 280 may then be fixedly attached to each other. The process described above may be reversed to assist in disassembling a busway 200. The stopper 150 also limits the travel of the components during separation.

While the specific connections between the joint puller 100 and the busway assembly 200 were described above with respect to FIG. 5, this particular connection is merely exemplary. In another configuration, shown in phantom in FIG. 6, the arm is connected to the second busway section and the lever is connected to the first busway section. In other embodiments (not shown) the joint puller may be connected to the right side of the busway assembly.

Figure 11:
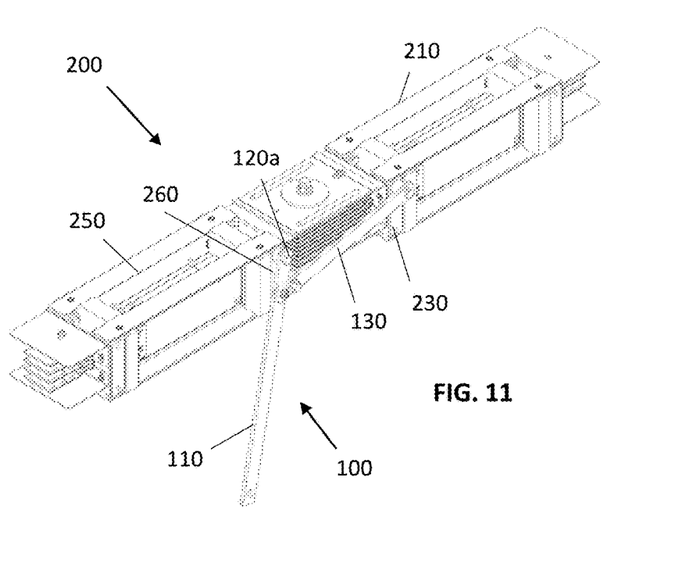
FIG. 11 is a perspective view of the joint puller connected to the busway assembly in a third position.
Figure 12:
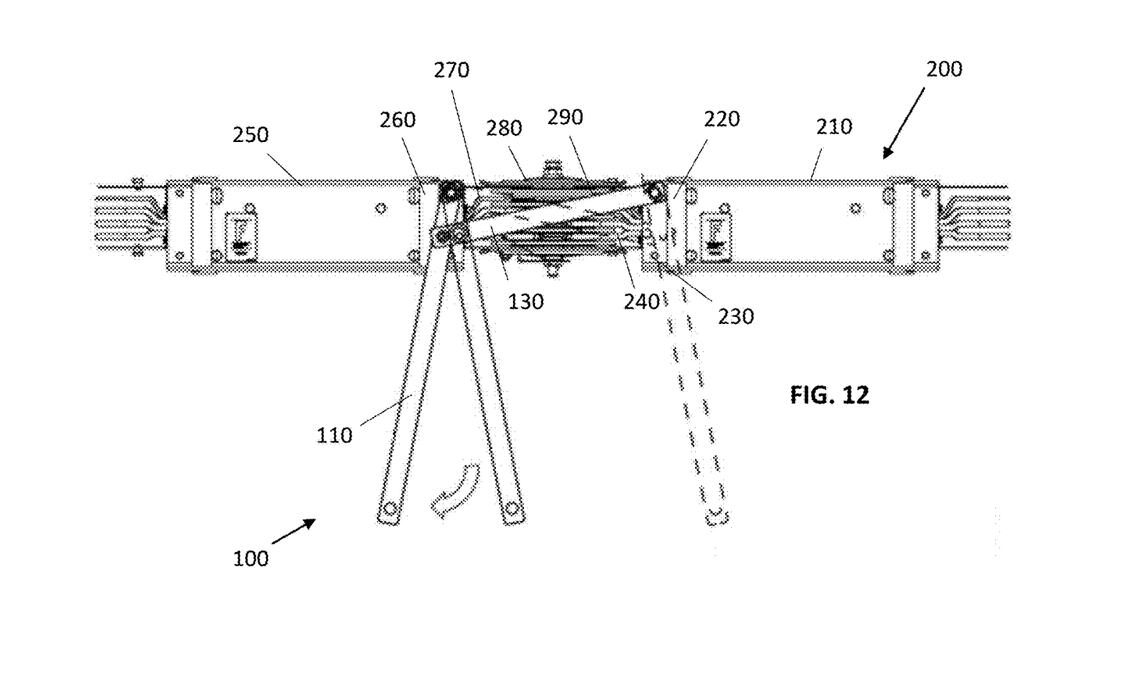
FIG. 12 is a side view of the joint puller connected to the busway in the third position, moving from a first orientation to a second orientation, with the joint puller in a fourth position also shown in phantom.

In still other embodiments, the joint puller 100 may be connected to upper apertures in the first and second end blocks 220, 260 such that the arm 110 extends downwards. FIGS. 11 and 12 illustrate a perspective and side view, respectively, of such a configuration. Here, the first arm end 120a is pivotally connected to a left side of the second busway section 250 at the second end block 260. The first spacer 180a is aligned with an aperture 160 of the first arm end 120a and an upper one of the apertures 230 of the second end block 260, such that the arm 110 extends downwards from the second end block 260. A fastener 170 is inserted through the apertures 160, 230 to pivotally connect the arm 110 to the second end block 260.

The second lever end 140b is pivotally connected to a left side of the first busway section 210 at the first end block 220. Here, the second spacer 180b is aligned with an aperture 160 of the second lever end 140b and an upper one of the apertures 230 of the first end block 220. A fastener 170 is inserted through the apertures 160, 230 to pivotally connect the lever 130 to the first end block 220. Thus, in the illustrated embodiment, the joint puller 100 is connected such that the lever 130 is pivotally connected to the first end block 220 and extends towards the second end block 260.

In another configuration, shown in phantom in FIG. 12, the arm is connected to the first busway section and the lever is connected to the second busway section. In other embodiments (not shown) the joint puller may be connected to the right side of the busway assembly.

Figure 13:
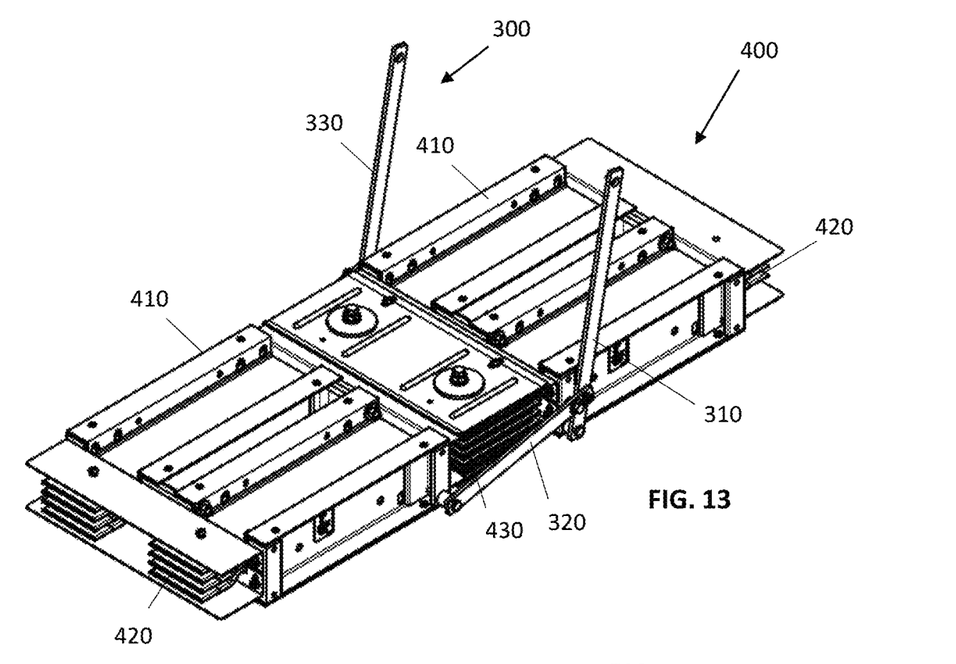
FIG. 13 is a perspective view of an alternative embodiment of a joint puller connected to an alternative embodiment of a busway.

FIG. 13 is a perspective view of an alternative embodiment of a joint puller 300 connected to an alternative embodiment of a busway assembly 400. In this embodiment, the joint puller 300 includes a first arm 310 and a first lever 320 that are assembled in substantially the same manner described above with respect to the joint puller 100. The first arm 310 and first lever 320 may be pivotally connected to one side of the busway assembly 400 in any of the manners described with respect to FIGS. 5-12 above.

The joint puller 300 further includes a second arm 330 pivotally connected to a second lever (not shown in this view) in the same manner described above with respect to the joint puller 100. The second arm 330 and second lever may be pivotally connected to an opposing side of the busway assembly 400 in any of the manners described with respect to FIGS. 5-12 above.

The joint puller 300 is operated in the same manner as the joint puller 100 described above. In some instances, it may be desirable to pivot both the first arm 310 and the second arm 330 in unison. Advancement in unison may prevent twisting or cocking during assembly. However, in other instances, the arms 310, 330 may be pivoted at different times or at different rates of speed.

In the illustrated embodiment, the busway assembly 400 is wider than the busway assembly 200 shown in FIGS. 5-12 above, with each busway section 410 having two sets of busbars 420. The bridge joint 430 includes wider sets of bridge plates 440 to accommodate the additional busbars and to balance the left and right sides. Such a configuration may be referred to as a double mod busway. However, the joint puller 300 is not limited to use with double mod busways and may be used with busway assemblies of any dimension.

Figure 14:
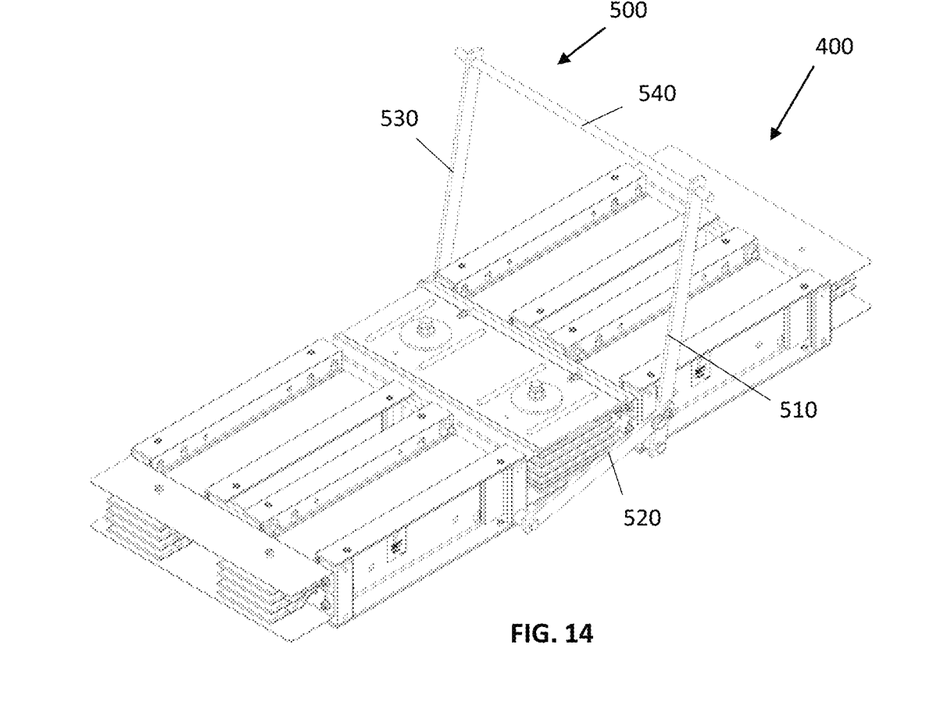
FIG. 14 is a perspective view of another alternative embodiment of a joint puller connected to the alternative embodiment of a busway.

FIG. 14 is a perspective view of another alternative embodiment of a joint puller 500 connected to the busway assembly 400. The joint puller 500 is substantially the same as the joint puller 300, except for the differences described herein. The joint puller 500 includes a first arm 510, first lever 520, second arm 530, and second lever (not shown in this view) that are connected to the busway assembly 400 in one of the manners described above. The joint puller 500 further includes a rod 540 extending from the first arm 510 to the second arm 530. In the illustrated embodiment, the rod 540 extends through apertures at the ends of each arm 510, 530. In an alternative embodiment (not shown), the rod is fixedly connected to the arms. In another alternative embodiment (not shown), the arms and rod are formed as a unitary structure.

The addition of the rod 540 allows the arms 510, 530 to be pivoted at the same time and at the same rate of speed by pulling the rod 540. Advancement in unison may prevent twisting or cocking during assembly. The rod may be manually pulled, or it may be pulled by a machine.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A busway assembly comprising:
   a first busway section having a first end terminating in a first end block,
   wherein the first busway section includes a first plurality of busbars that are exposed at the first end, and
   wherein the first end block has a first plurality of apertures;
   a second busway section having a second end terminating in a second end block,
   wherein the second busway section includes a second plurality of busbars that are exposed at the second end, and
   wherein the second end block has a second plurality of apertures;
   a bridge joint having a first end and a second end, the bridge joint being disposed between the first busway section and the second busway section,
   wherein the bridge joint includes a plurality of bridge plates that are exposed at both the first and second ends of the bridge joint,
   wherein the bridge plates are configured to receive the first plurality of busbars at the first end of the bridge joint, and
   wherein the bridge plates are configured to receive the second plurality of busbars at the second end of the bridge joint; and
   a joint puller assembly including:
      a lever having a first lever end and a second lever end,
      an arm having a first arm end and a second arm end, the arm being pivotally connected to the first lever end at a location spaced from the first arm end,
      a second arm pivotally connected to a second lever, the second arm being pivotally connected to a second side of the first busway section at the first end block, and the second lever being pivotally connected to a second side of the second busway section at the second end block, and
      a stopper extending from the lever at a location spaced from the first lever end,
         wherein the stopper extends in a direction normal to the lever and normal to the arm, such that the stopper is configured to contact the arm to limit rotation between the lever and the arm,
         wherein the first arm end is pivotally connected to a first side of the first busway section at the first end block, through one of the first plurality of apertures, and
         wherein the second lever end is pivotally connected to a first side of the second busway section at the second end block, through one of the second plurality of apertures.

2. The busway assembly of claim 1, further comprising a first spacer connected to the first arm end and a second spacer connected to the second lever end.

3. The busway assembly of claim 1, further comprising a rod extending from the first arm to the second arm.

4. The busway assembly of claim 1, wherein the first plurality of apertures are threaded apertures and wherein the second plurality of apertures are threaded apertures.

5. A method of assembling a busway, the method comprising:
   providing a first busway section having a first pair of end blocks and a first plurality of busbars;
   providing a second busway section having a second pair of end blocks and a second plurality of busbars;
   providing a bridge joint between the first busway section and the second busway section, wherein the bridge joint includes a plurality of bridge plates;
   providing a joint puller assembly including:
      a lever having a first lever end and a second lever end, an arm having a first arm end and a second arm end, the arm being pivotally connected to the first lever end at a location spaced from the first arm end, and a stopper extending from the lever at a location spaced from the first lever end, the stopper extending normal to the lever and normal to the arm, such that the stopper is configured to contact the arm to limit rotation between the lever and the arm;

aligning the first plurality of busbars and the second plurality of busbars with the bridge plates;

pivotally connecting the first arm end to a first side of the first busway section at one of the first pair of end blocks;

pivotally connecting the second lever end to a first side of the second busway section at one of the second pair of end blocks;

pivoting the arm such that the first plurality of busbars and the second plurality of busbars each engage the bridge plates; and removing the first arm end from the first side of the first busway section and removing the second arm end from the first side of the second busway section.

6. The method of claim 5, wherein the step of pivotally connecting the first arm end to a first side of the first busway section includes aligning an aperture on the first arm end with an aperture on the first side of the first busway section, and inserting a first fastener through the aligned apertures.

7. The method of claim 6, wherein the step of pivotally connecting the second lever end to a first side of the second busway section includes aligning an aperture on the second lever end with an aperture on the first side of the second busway section, and inserting a second fastener through the aligned apertures.

8. The method of claim 5, wherein the step of pivoting the arm includes pivoting the arm until the stopper contacts the arm.

9. The method of claim 5, wherein the joint puller assembly further includes a second arm pivotally connected to a second lever, and a rod extending from the first arm to the second arm.

10. The method of claim 9, further comprising pivotally connecting the second arm to a second side of the first busway section at one of the first pair of end blocks, and pivotally connecting the second lever to a second side of the second busway section at one of the second pair of end blocks.

11. The method of claim 10, wherein the step of pivoting the arm includes manually pulling the rod, such that the arm and the second arm both pivot towards the first busway section.

12. The method of claim 5, further comprising pivoting the arm in an opposite direction to separate the first and second busway sections from the bridge joint.

13. A joint puller configured to engage a busway, the joint puller comprising:

an arm having a first arm end and a second arm end, wherein the first arm end is configured to be pivotally connected to a first busway section;

a lever having a first lever end and a second lever end; wherein the second lever end is configured to be pivotally connected to a second busway section, and wherein the first lever end is pivotally connected to the arm at a location spaced from the first arm end; and a stopper extending from the lever at a location spaced from the first lever end, wherein the stopper extends in a direction normal to the lever and normal to the arm, wherein the stopper comes into contact with the arm when the arm is pivoted to a predetermined angle with respect to the lever, thereby limiting rotation between the lever and the arm.

14. The joint puller of claim 13, further comprising a second arm pivotally connected to a second lever, the second arm being configured to pivotally connect to the first busway section, and the second lever being configured to pivotally connect to the second busway section.

15. The joint puller of claim 14, wherein the lever is spaced apart from the second lever.

16. The joint puller of claim 14, further comprising a rod extending from the first arm to the second arm.

17. The joint puller of claim 13, further comprising a first spacer connected to the first arm end and a second spacer connected to the second lever end.

18. The joint puller of claim 13, wherein the joint puller is configured to be connected to the first and second busway sections in multiple orientations.

\* \* \* \* \*